(12) United States Patent
Steinberger et al.

(10) Patent No.: US 8,608,579 B2
(45) Date of Patent: Dec. 17, 2013

(54) RING RIVET

(75) Inventors: Markus Steinberger, Macedonia, OH (US); Kunding Wang, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/368,504

(22) Filed: Feb. 8, 2012

(65) Prior Publication Data

US 2012/0205214 A1 Aug. 16, 2012

Related U.S. Application Data

(60) Provisional application No. 61/443,034, filed on Feb. 15, 2011.

(51) Int. Cl.
*F16D 1/072* (2006.01)

(52) U.S. Cl.
USPC ........................ 464/182; 403/278; 403/359.5

(58) Field of Classification Search
USPC ......... 464/98, 182; 403/278, 359.5; 192/3.29; 411/520, 521; 29/525.05, 525.06
See application file for complete search history.

(56) References Cited

U.S. PATENT DOCUMENTS

| | | | | |
|---|---|---|---|---|
| 2,089,168 A | * | 8/1937 | Brown | 403/359.5 X |
| 2,931,412 A | * | 4/1960 | Wing | 411/521 X |
| 5,477,950 A | * | 12/1995 | Maloof | 192/3.29 |
| 5,807,180 A | * | 9/1998 | Knodle et al. | |
| 6,371,268 B1 | | 4/2002 | McMorris et al. | |
| 7,658,679 B2 | | 2/2010 | Avins et al. | |

FOREIGN PATENT DOCUMENTS

| | | | | |
|---|---|---|---|---|
| GB | 302625 | * | 12/1928 | 464/98 |
| SU | 665128 | * | 5/1979 | 403/359.6 |

* cited by examiner

*Primary Examiner* — Gregory Binda
(74) *Attorney, Agent, or Firm* — Simpson & Simpson, PLLC

(57) ABSTRACT

An assembly for transferring torque including a first component having first wall portions, a second component having second wall portions, wherein the first wall portions extend radially from the first component toward the second component, the second wall portions extend radially from the second component toward the first component, the first wall portions are axially aligned with the second wall portions, and a clearance is formed between the first and second wall portions, and a ring rivet having a connecting portion inserted into the clearance and deformed for creating at least one head for axially locking the first component and the second component together, and wherein deforming the connecting portion fills the clearance for rotationally locking the first component and second component together for enabling a transfer of torque between the first component and the second component.

10 Claims, 7 Drawing Sheets

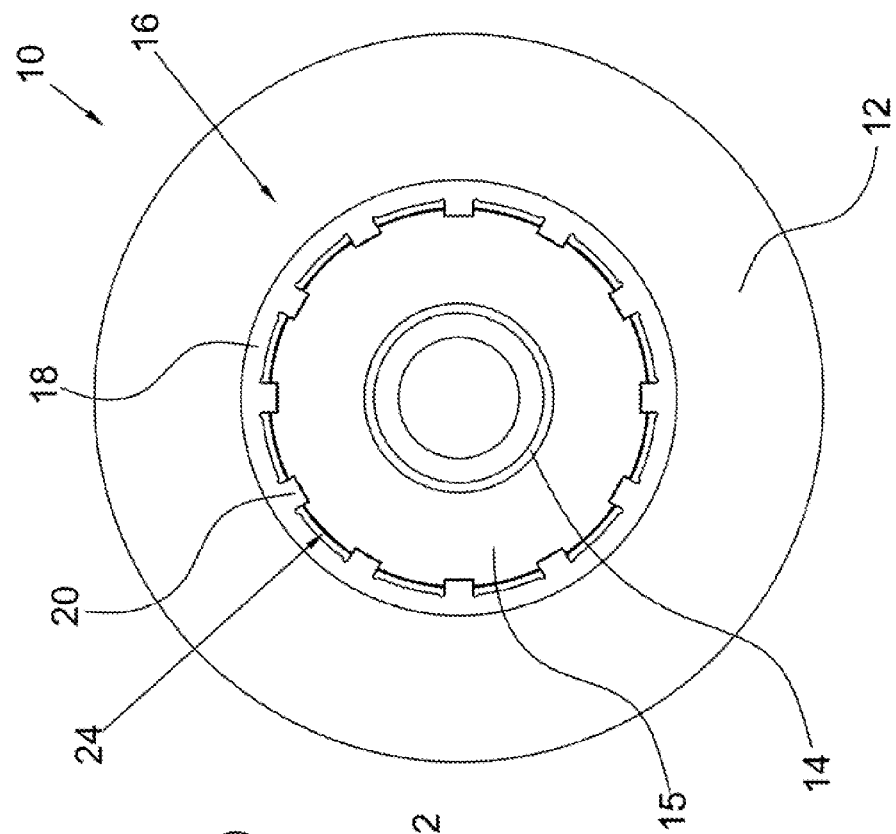
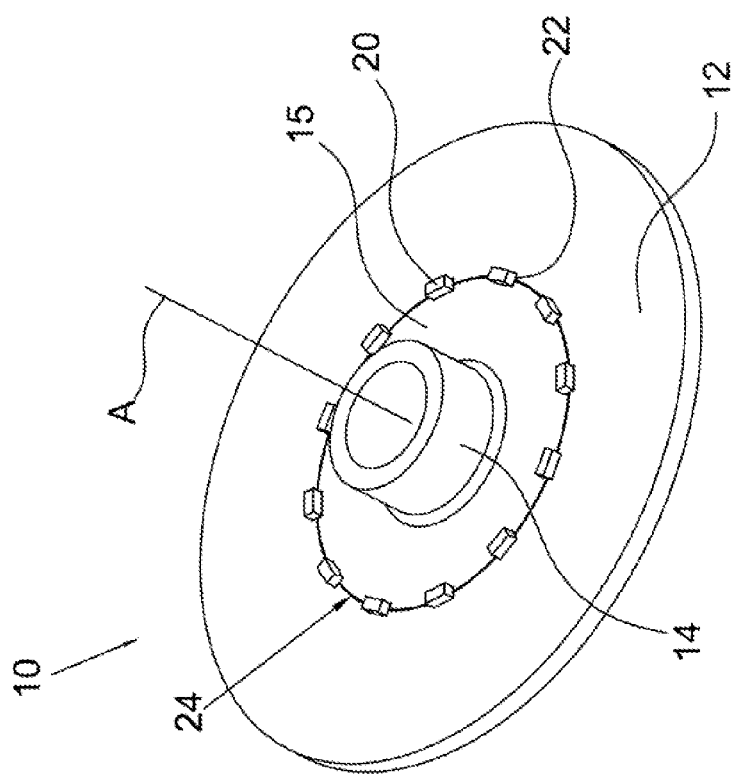

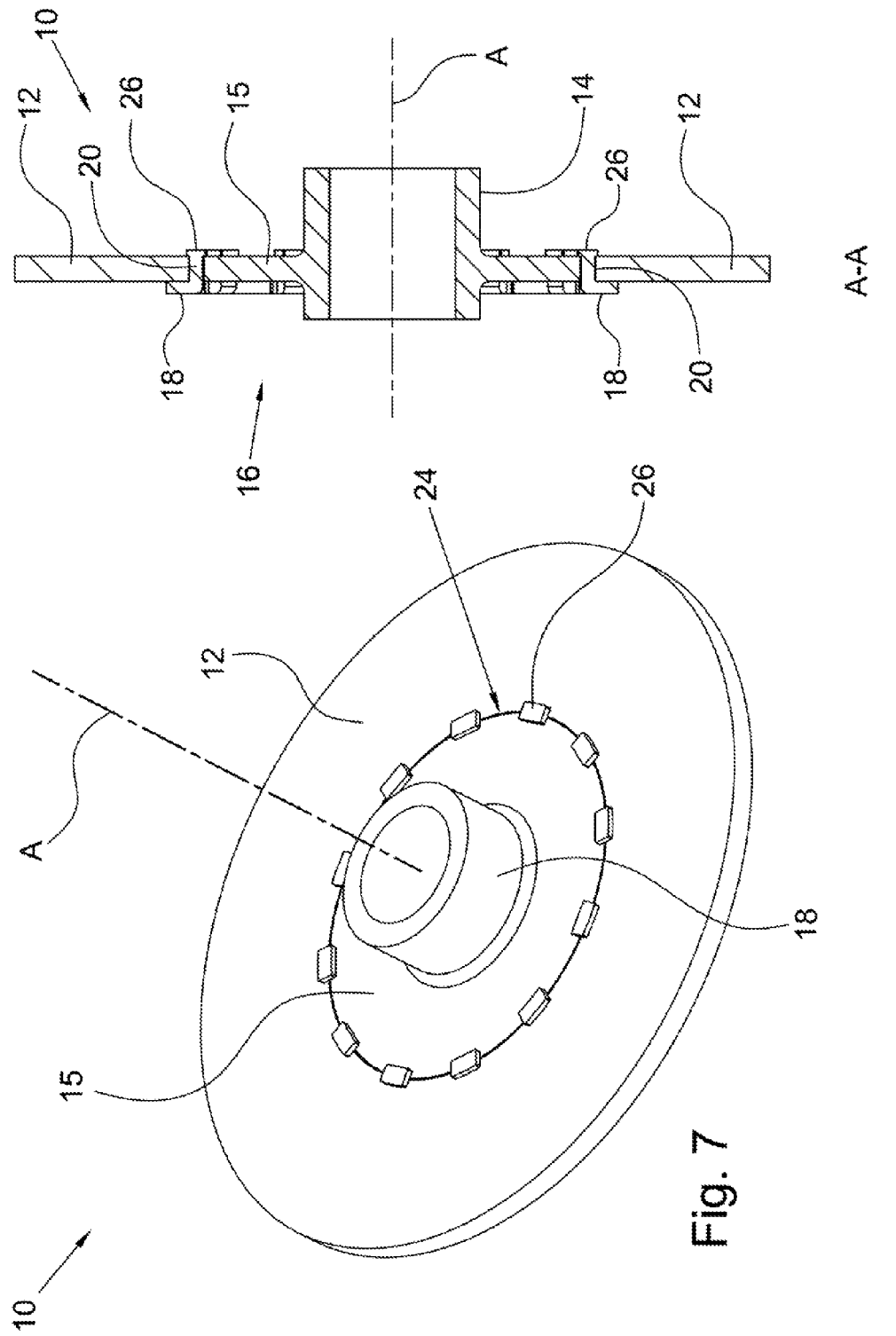

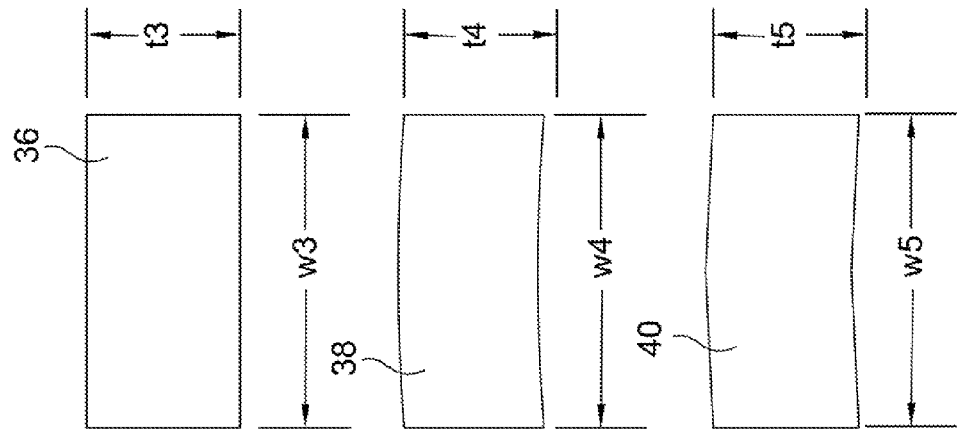
Fig. 10A
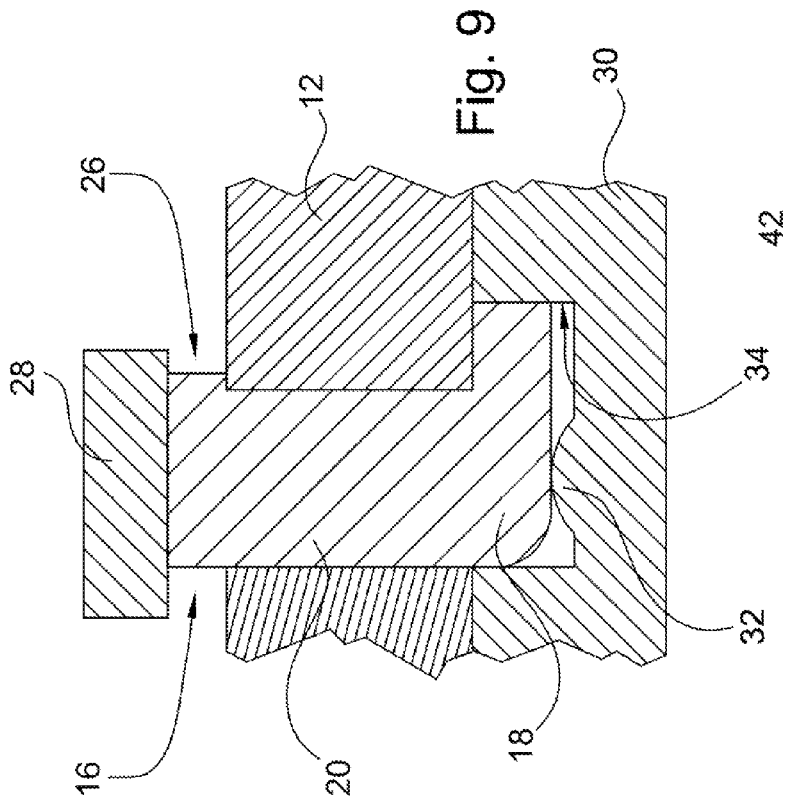
Fig. 9
Fig. 10B

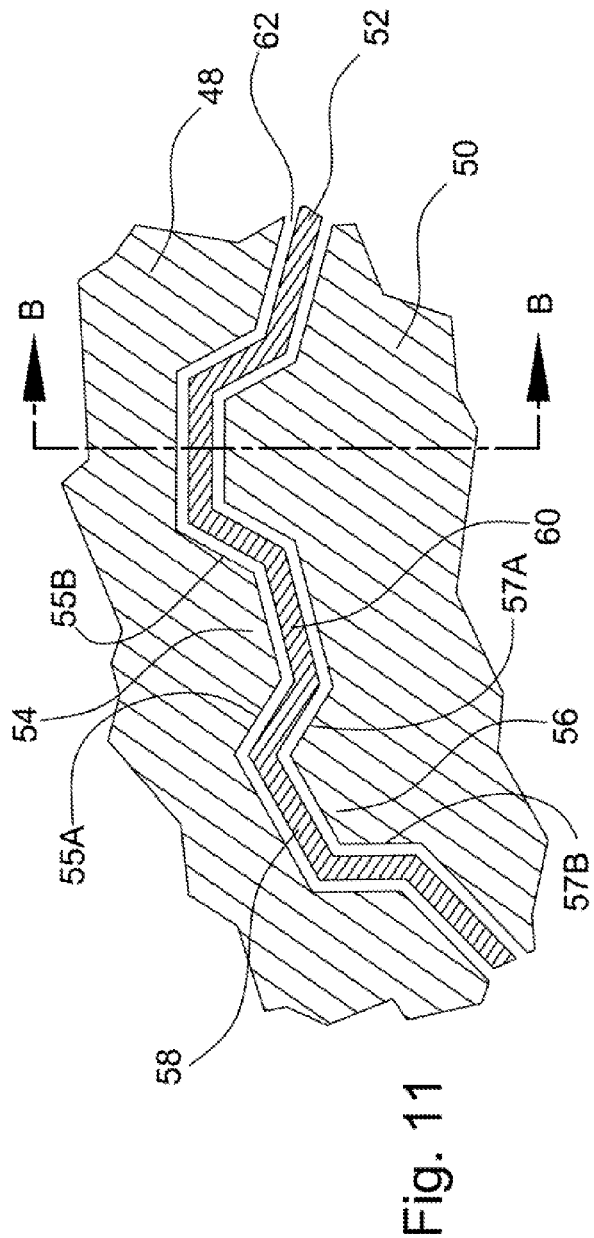
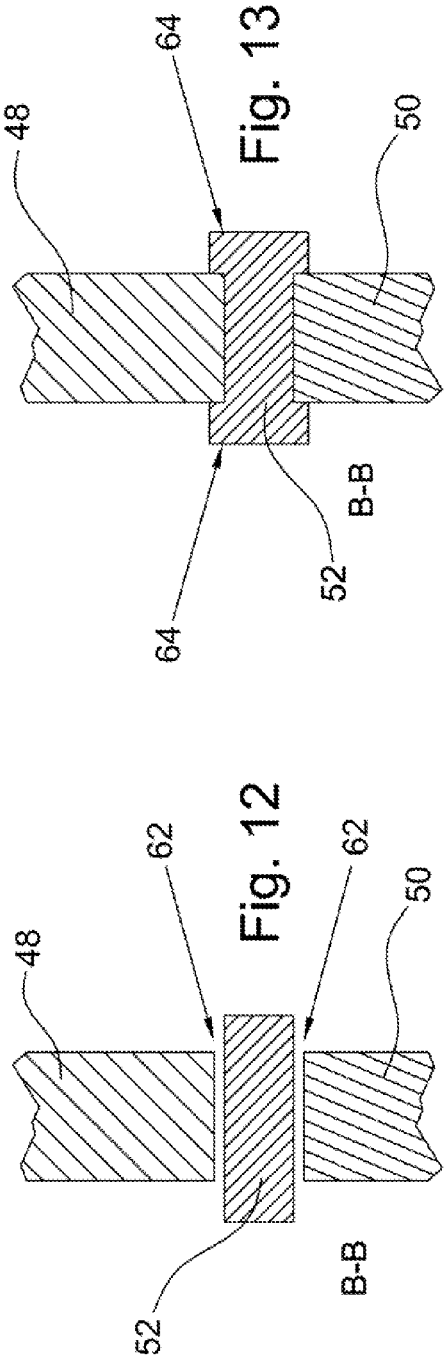

RING RIVET

CROSS-REFERENCE TO RELATED APPLICATIONS

This application claims the benefit under 35 U.S.C. §119(e) of U.S. Provisional Patent Application No. 61/443,034 filed Feb. 15, 2011, which application is incorporated herein by reference.

FIELD OF THE INVENTION

The invention broadly relates to torque transferring assemblies, more specifically to axially compact torque transferring assemblies, and even more particularly to a deformable ring rivet for enabling torque to be transferred between two axially aligned components.

BACKGROUND OF THE INVENTION

Rivet connections are commonly used in torque converters, for example, for securing a damper flange to a damper hub. For example, see U.S. Pat. No. 7,658,679 (Avins et al.), which patent is hereby incorporated by reference in its entirety. Rivets may also be used between any other two components that transfer or transmit torque. Riveted connections, such as between the damper flange and the hub, require a large number of rivets that must be individually inserted during assembly and then deformed in a riveting die. A large number of rivets is required in order to reduce the shear stress levels in each rivet to an acceptable level for transferring torque between the flange and the hub, thereby increasing assembly time. In addition, the flange and the hub are axially stacked, which requires additional axial space. Another option is to secure the damper flange to the hub with a splined connection, however this can be expensive and time consuming to manufacture due to the strict tolerances, for example, that must be met to ensure a good connection between the parts. Vibrations will result in the system if the splined connection is not manufactured precisely. Therefore, there is needed, for example, an assembly that connects two torque transferring components without a splined connection or a plurality of individual rivets, and that saves axial space by connecting the components in an axially aligned orientation.

BRIEF SUMMARY OF THE INVENTION

The present invention broadly comprises an assembly for transferring torque including a first component having a first plurality of first wall portions, a second component having a second plurality of second wall portions, wherein the first wall portions extend radially from the first component toward the second component, the second wall portions extend radially from the second component toward the first component, the first wall portions are axially aligned with the second wall portions, and a radial clearance is formed between the first and second wall portions, and a ring rivet having a connecting portion inserted into the radial clearance between the first and second wall portions and deformed for creating at least one head on at least one axial side of the assembly for axially locking the first component and the second component together, and wherein deforming the connecting portion of the ring rivet fills the radial clearance for creating a positive fit between the connecting portion and each of the first and second components for rotationally locking the first component and second component together for enabling a transfer of torque between the first component and the second component.

In one embodiment, the first component comprises a radially extending plate and the second component comprises an annular projection extending radially from the second component, wherein the annular projection is axially aligned with the first component and includes the second wall portions. In one embodiment, the first component includes a first set of first notches, each of the first notches forming two of the first wall portions, wherein the second component includes a second set of second notches in the annular projection, each of the second notches forming two of the second wall portions, and wherein each of the first notches is paired with one of the second notches for together forming a plurality of enlarged openings as part of the radial clearance for engagement with the connecting portion of the ring rivet. In a further embodiment, the connecting portion of the ring rivet comprises a plurality of tabs extending axially from a ring body. In yet another embodiment, the tabs each have a first shape and the enlarged openings each have a second shape, and the first and second shapes are each selected from the group consisting of a rectangular shape, an arced shape, and a herringbone shape. In another embodiment, the first shape is the arced shape and the second shape is the rectangular shape. In one embodiment, the first shape has a first width and a first thickness, the second shape a second width and a second thickness, and the first width is less than the second width and the first thickness is less than the second thickness.

In one embodiment, the ring rivet is formed as an undulating ring and the connecting portion of the ring rivet comprises an alternating plurality of radially arranged crests and troughs. In a further embodiment, the first component has a first set of first teeth, wherein each first tooth in the first set forms two of the first wall portions, and the second component has a second set of second teeth, wherein each second tooth in the second set forms two of the second wall portions. In another embodiment, the connecting portion is deformed on both opposite axial sides of the assembly.

The current invention also broadly comprises an assembly for transferring torque in a torque converter including a damper flange having a first plurality of first wall portions, a hub having a second plurality of second wall portions, wherein the first wall portions extend radially from the damper flange toward the hub, the second wall portions extend radially from the hub toward the damper flange, the first wall portions are axially aligned with the second wall portions, and a radial clearance is formed between the first and second wall portions, and a ring rivet having a connecting portion inserted into the radial clearance between the first and second wall portions and deformed for creating at least one head on at least one axial side of the assembly for axially locking the damper flange and the hub together, and wherein deforming the connecting portion of the ring rivet fills the radial clearance for creating a positive fit between the connecting portion and each of the damper flange and the hub for rotationally locking the damper flange and hub together for enabling a transfer of torque between the damper flange and the hub.

In one embodiment, the damper flange comprises a radially extending plate and the hub comprises a radially extending, annular projection wherein the annular projection is axially aligned with the radially extending plate and includes the second wall portions. In one embodiment, the damper flange includes a first set of first notches, each of the first notches forming two of the first wall portions, wherein the hub includes a second set of second notches in the annular projection, each of the second notches forming two of the second wall portions, and wherein each of the first notches is paired with one of the second notches for together forming a plurality of enlarged openings as part of the radial clearance for engagement with the connecting portion of the ring rivet. In another embodiment, the connecting portion of the ring rivet comprises a plurality of tabs extending axially from a ring body. In a further embodiment, the tabs each have a first shape and the enlarged openings each have a second shape, and the first and second shapes are each selected from the group consisting of a rectangular shape, an arced shape, and a herringbone shape. In one embodiment, the first shape is the arced shape and the second shape is the rectangular shape. In another embodiment, the first shape has a first width and a first thickness, the second shape a second width and a second thickness, and the first width is less than the second width and the first thickness is less than the second thickness.

In one embodiment, the ring rivet is formed as an undulating ring and the connecting portion of the ring rivet comprises an alternating plurality of radially arranged crests and troughs. In another embodiment, the damper flange has a first set of first teeth, wherein each first tooth in the first set forms two of the first wall portions, and the hub has a second set of second teeth, wherein each second tooth in the second set forms two of the second wall portions. In one embodiment, the connecting portion is deformed on both opposite axial sides of the assembly.

It is a general object to create a connection between two torque transmitting components in an axially compact manner. It is another general object to reduce the number of components needed for assembly of a torque transferring system. It is another general object to create a positive fit between two torque transferring components. These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 3 is a perspective view of the assembly of FIG. 1;

FIG. 4 is a view of a first axial side of the assembly of FIG. 1 before upsetting;

FIG. 7 is a perspective view of the assembly of FIG. 1 after upsetting;

FIG. 8 is a cross-sectional view of the assembly taken generally long line A-A in FIG. 4, but after upsetting;

FIG. 9 is a cross-sectional view of a ring rivet of the assembly of FIG. 1 being upset in a die set;

FIG. 10A illustrates examples of shapes for tabs and/or openings of the assembly of FIG. 1;

FIG. 10B illustrates an example of a tab in an opening for the FIG. 1 assembly;

FIG. 11 is a cross-sectional view of a torque transferring assembly according to a second embodiment of the current invention;

FIG. 12 is a cross-sectional view of the assembly generally taken along line B-B in FIG. 11, before upsetting; and, FIG. 13 is a cross-sectional view of the assembly generally taken along line B-B in FIG. 11, after upsetting.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "upset" refers to the riveting process in which the rivet is smashed, pressed, or otherwise deformed in order to secure two or more components together. Although any methods, devices or materials similar or equivalent to those described herein can be used in the practice or testing of the invention, the preferred methods, devices, and materials are now described.

Figure 1:
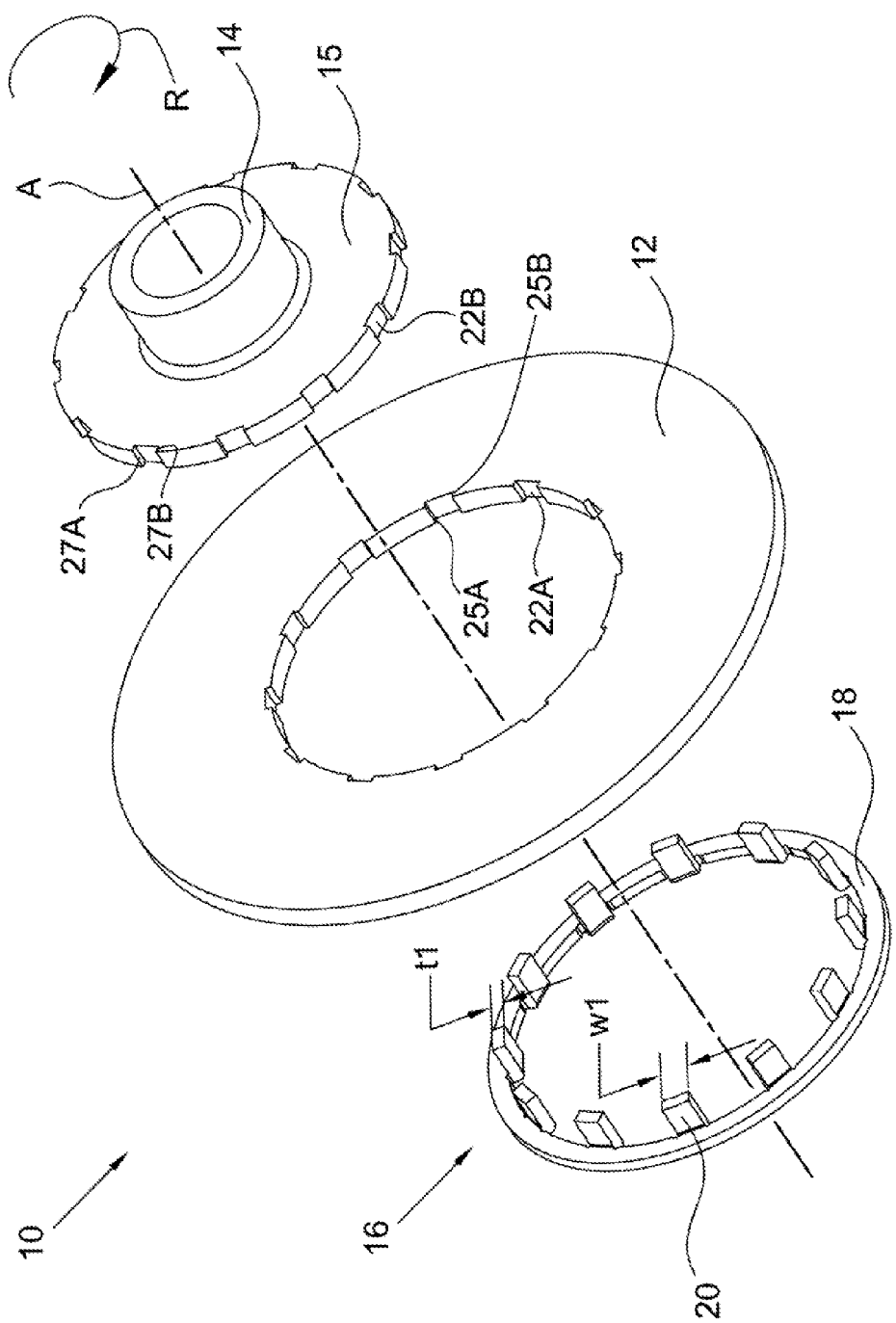
FIG. 1 is an exploded perspective view of a torque transferring assembly according to a first embodiment of the current invention.

Referring now to the figures, FIG. 1 shows an exploded view of assembly 10. Assembly 10 includes flange 12 connected to hub 14, specifically radial projection 15 of hub 14, via ring rivet 16. Ring rivet 16 includes ring body 18 with a plurality of tabs 20 extending axially from the inner diameter of the ring body. The ring body is formed as an essentially continuous ring that is matingly engagable against an axial surface of the flange or hub. It should be appreciated that the tabs could alternatively extend from the outer diameter, or some other portion of the ring body. Each tab has a width, designated width w1, and a thickness, designated thickness t1.

Figure 2:
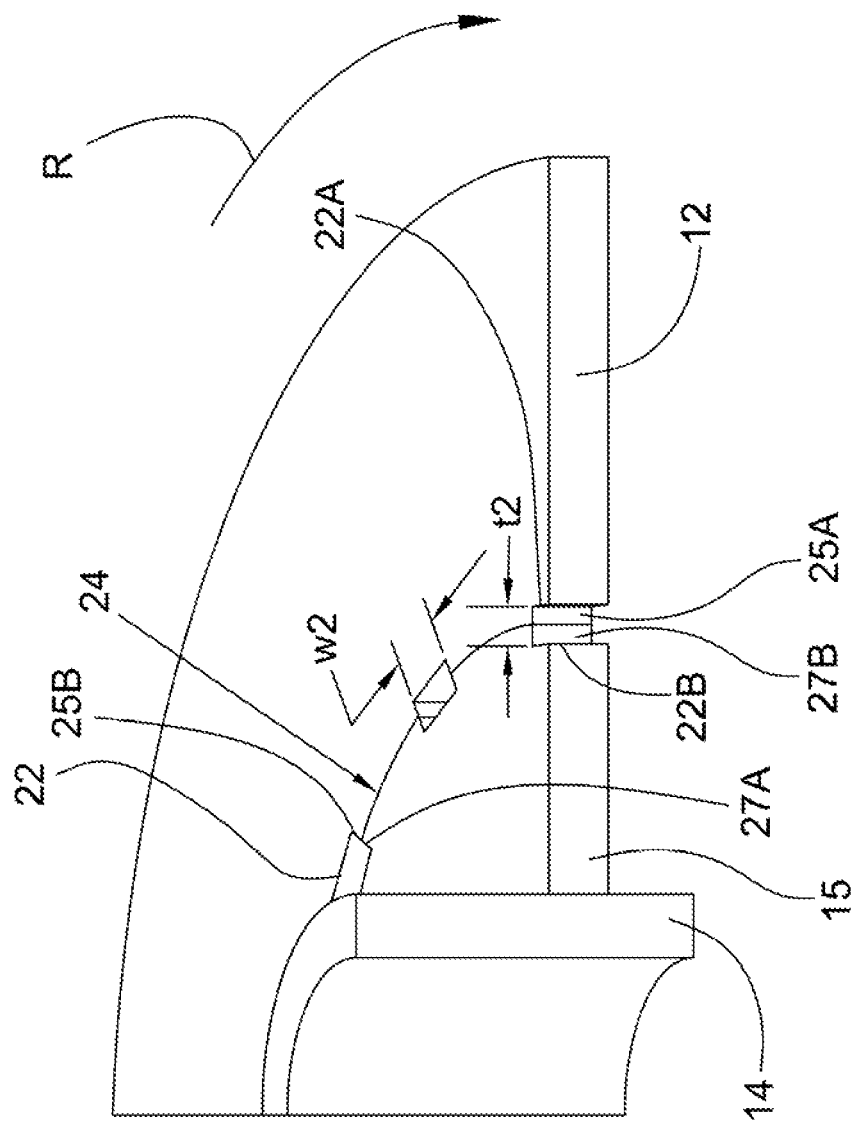
FIG. 2 is a cross-sectional view of two torque transferring components of the assembly of FIG. 1.
Figure 6:
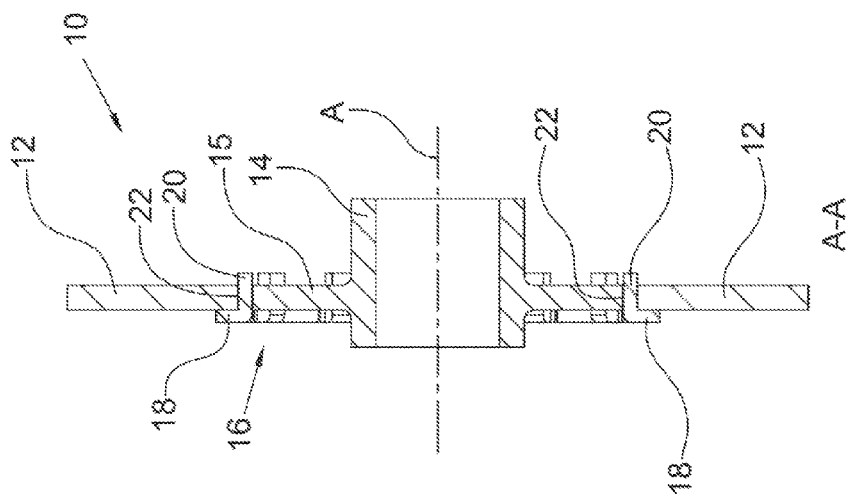
FIG. 6 is a cross-sectional view of the assembly before upsetting taken generally along line A-A in FIG. 4.
Figure 5:
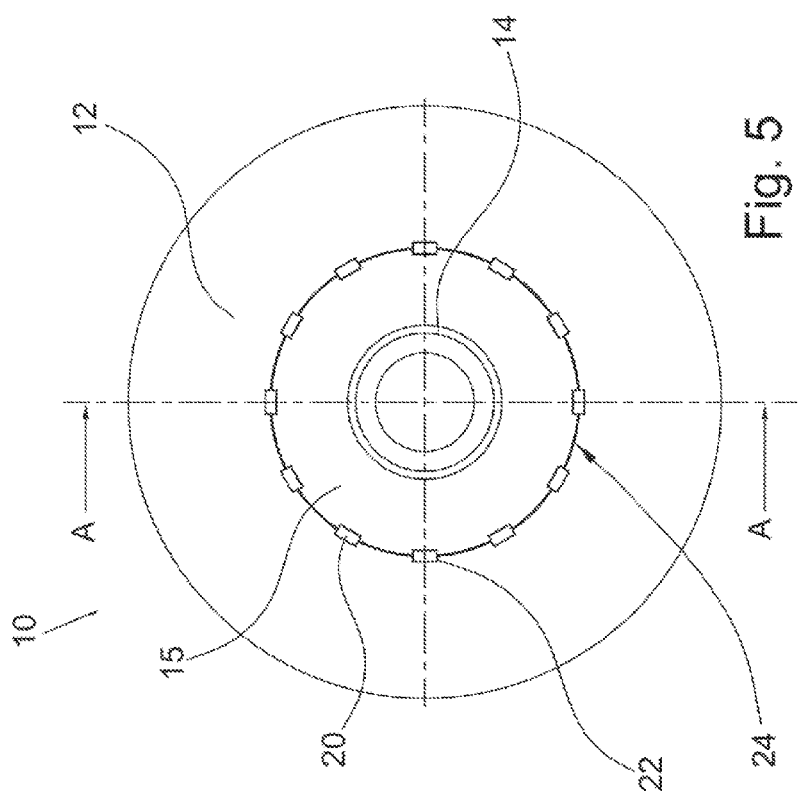
FIG. 5 is a view of a second axial side of the assembly of FIG. 1 before upsetting.

Flange 12 includes notches 22A about its inner diameter, while projection 15 of hub 14 includes notches 22B about its outer diameter. As can be seen in FIG. 2, flange 12 and hub 14 are complementarily formed such that projection 15 of hub 14 fits radially within the inner diameter of flange 12. Interface 24, shown in FIG. 2, is formed between the outer diameter of the hub and inner diameter of the flange. The interface may include some small amount of radial clearance to ensure the two components will fit together easily. For example, unlike a splined connection, looser tolerances can be used in current invention assemblies. When axially and rotationally aligned, notches 22A and 22B together form openings 22. Openings 22 are operatively sized having width w2 and thickness t2 for receiving tabs 20 therethrough. The openings are likewise formed with some clearance and/or as an enlarged portion of the clearance between the flange and the hub, for example, to enable less strict tolerances to be used and/or to increase the ease of assembly. As shown in FIG. 4, ring body 18 of ring rivet 16 is matingly engaged against the flange so that, as shown in FIG. 3, tabs 20 extend axially through openings 22. The tabs will later be upset or deformed in order to fill the clearance.

Notches 22A define wall portions 25A and 25B, and notches 22B define wall portions 27A and 27B, for transferring torque between flange 12 and hub 14 via tabs 20 on ring rivet 16. Following the direction indicated by arrow R, wall portions 25A and 27B are located on one side of notches 22A and 22B, respectively, from wall portions 25B and 27A. The wall portions are essentially radially extending surfaces that radially overlap the tabs of the ring rivet, such that rotation of the flange and/or hub results in the wall portions of the flange and/or hub pressing on the tabs. By radially overlap, it is meant that there is at least a portion of both components that is located within the same range of radial distances. Wall portions 25A and 25B are further in a radial direction orthogonal to axis of rotation A than wall portions 27B and 27A, respectively, as seen in FIG. 2.

Tabs 20 of ring rivet 16 are shown in FIGS. 7-9 after they have been upset in order to form head 26. Forming of head 26 results in plastic deformation of the tabs so that the tabs expand in the radial and circumferential directions, with respect to axis of rotation A, in order to axially lock the flange and hub together between head 26 and ring body 18. The ring body also helps support the ring rivet during the upsetting process. Furthermore, the tabs expand in order to fill any clearance between the flange and the hub to create a positive fit or positive lock between the components. By positive fit or lock it is generally meant that the tabs have expanded to such a degree that there is interference between the tabs and the walls of the openings and/or that the tabs are exerting pressure on the walls of the openings in the radial and/or circumferential directions.

The radial overlap between the wall portions and the tabs enables the two components to transfer torque between each other. With respect to FIGS. 1 and 2, which have the best views of the wall portions of flange 12 and hub 14, assume assembly 10 is entirely assembled and tabs 20 have been inserted into openings 22 and upset as described above. Then, once assembled, rotation of flange 12 about axis A in the direction indicated by arrow R will result in torque being transferred from the flange to the ring rivet via wall portions 25A, which wall portions radially overlap tabs 20 in openings 22. This will result in tabs 20 transferring the torque to wall portions 27A of projection 15 of hub 14, which wall portions radially overlap the tabs. On the other hand, rotation of the flange in the direction opposite to the direction of arrow R would result in wall portions 25B transferring torque to the tabs, which would then transfer the torque to wall portions 27B of the projection of the hub. Each notch thus forms two torque transferring wall portions, although only one wall portion of each notch is used for each direction of rotation of the assembly. In this way, torque can be transferred between the hub and flange while the hub and flange are axially aligned for saving axial space. By axially aligned, it meant that the components are located at substantially the same axial distance along axis A.

Since all of the tabs are formed on the ring rivet, only a single component, as opposed to a plurality of individual rivets, needs to be installed during assembly. In prior art systems, for example, the damper flange is either axially stacked (not axially aligned) with an annular projection of the hub, with a portion of the hub and flange radially overlapping for securing a plurality of rivets through (as shown in Avins et al., incorporated supra). The prior art therefore requires more axial space than current invention assemblies. Saving axial space, for example, enables other components of the torque converter to be increased in size, in order to increase the capacity or performance of the torque converter without increasing overall size, or to save on material costs and/or create a smaller overall sized torque converter. The flange could alternatively be secured to the hub with a splined connection, however, splined connections are expensive and time consuming to manufacture due to strict tolerances that must be met for proper meshing of the splined connection.

The upsetting process could use, for example, dies on opposite sides of the ring rivet in order to upset the tabs. For example, dies 28 and 30 are shown in FIG. 9 for upsetting the tabs of the ring rivet. In the example of FIG. 9, die 30 includes two features to help the tabs deform properly. Specifically, die 30 includes dimple 32, which is formed, for example, as an annular raised portion or plurality of raised portions that align on rivet body 18 of the ring rivet opposite tabs 20. Die 30 may also include radial wall 34, that engages with the outer circumference of ring body 18. Dimple 32 and radial wall 34 assist in the flow of material of the ring rivet to fill the clearance around the tabs in the openings. For example, the dimple helps direct material into openings 22 to assist in the expansion of the tabs in openings 22 by concentrating force directly into the tabs, while radial wall 34 prevents the ring body from expanding, which causes material to instead flow into the openings to expand the tabs and lock the components together.

Several possible shapes for openings 22 and/or tabs 20 are shown in FIG. 10A, although it should be understood that other shapes could be used. For example, shape 36 is substantially rectangular having width w3 and thickness t3. Shape 38 resembles shape 36, having width w4 and thickness t4, but having a slight curvature to one set of parallel sides (e.g., the curvature substantially corresponding to the inner/outer diameter of the flange/hub or defined by a radius concentric with the inner/outer diameters). Shape 38 is generally referred to as the arced shape. Shape 40 likewise generally resembles shape 36, with width w5 and thickness t5, but with one set of parallel sides having resembling nested, shallow v-shapes. Shape 40 is generally referred to as the herringbone shape. For example, FIG. 10B shows an example with tab 42, having shape 38, engaged in opening 44, having shape 36. As mentioned above, it should be more easily appreciated in view of FIG. 10B that before upsetting, clearance 46 exists about the tab in the opening, but this clearance is filled when the tab is upset. That is, the tab is expanded so that it presses against the walls of the opening.

Filling the clearance, for example, removes any play, or relative motion, between the flange and hub, thereby reducing rattling and increasing performance. For this reason, the clearance should be kept small in order to ensure the tab can expand sufficiently to fill the clearance. For example, filling the clearance may result in frictional, contact, and/or interference forces between the circumferential surfaces of the tabs and openings, which help to transfer torque in addition to wall portions 25A and 25B. It should also be appreciated, for example that increasing tab thickness, such as thickness t1 (and thicknesses t3, t4, or t5 in some embodiments) increases the amount of torque that can be transmitted, while increasing tab width, such as width w1 (and widths w3, w4, or w5 in some embodiments) reduces the shear stress from torque transmission.

In one embodiment, flange 12 is a flange for a damper of a torque converter, while hub 14 is a turbine hub for a torque converter. However, in view of the above description, it should be understood that flange 12 and hub 14 generally represent any two components in torque converters or other torque transferring devices, which need to be rotationally locked together for transferring torque between them and/or which need to be connected in an axially aligned, space-saving manner. As one example of a torque converter damper flange and hub, it has been found that suitable results can be achieved for a typical torque converter using twenty tabs on a ring rivet, with a radial clearance gap of 0.3 mm between the two components, the radial clearance gap located at a radial distance of approximately 38 mm-40 mm (e.g., interface 24 located approximately 39 mm from axis A with 0.3 mm gap between the inner diameter of the flange and the outer diameter of the hub), with the tab width being 6 mm, the tab thickness being 2.75 mm, and the first and second components having an axial thickness of approximately 5 mm. It should be appreciated that this is merely one example and should not be considered limiting to the scope of the current invention, but rather is illustrative of one embodiment that has been found to give suitable results.

Another embodiment according to the current invention is shown in FIGS. 11-13. In this embodiment, outer component 48 is to be connected to inner component 50 via ring rivet 52. Outer component 48 includes teeth 54 protruding radially inward from the outer component, which alternatively correspond with teeth 56, which protrude radially outward from inner component 50. Ring rivet 52 is formed having a wavy or undulating shape, with crests 58 arranged to accommodate teeth 54 and troughs 60 arranged to accommodate teeth 56. Thus, the crests are formed as radially outwardly extending portions on the wave-shaped ring rivet, while the troughs are radially inwardly extending portions on the wave-shaped ring rivet. The components are initially assembled with clearance 62 is formed between them.

Outer component 48, inner component 50, and ring rivet 52 are arranged having a clearance 62 between them, as shown in FIG. 12, with the ring rivet extending axially past both the outer and inner components. Thus, teeth 54 and 56 form a mating geometry, similar to a gear meshing or splined connection, except with a relatively large clearance between them for receiving ring rivet 52. Despite being relatively large in comparison to typical splined connections, clearance 62 may total only approximately 0.3 mm in radial width. Similar to wall portions 25A, 25B, 27A and 27B, teeth 54 have wall portions 55A and 55B and teeth 56 have wall portions 57A and 57B. While upsetting the ring rivet, such as with a die set, deformed heads 64 are formed on axially opposite sides of the ring rivet for preventing relative axial movement between the components. In an example embodiment, only portions of ring rivet 52 adjacent to wall portions 55 and 57 are upset to form heads 64. That is, after upsetting, ring rivet 52 includes a non-upset portion between wall portions 55 and 57, and an upset portion adjacent to portions 55 and 57.

Upsetting the ring rivet results in the ring expanding to fill the clearance in order to prevent any play between the components for reducing rattling and improving performance. That is, in accordance with the above description of the tabs of the embodiment of FIGS. 1-9, the portion of the ring rivet 52 located between the inner and outer components acts as a connecting portion for connecting the outer and inner component rotationally with a positive fit so that torque can be transferred or transmitted between them. For example, after the rivet ring is upset, rotation of outer component 48 in the counter-clockwise direction with respect to the orientation of FIG. 11 would cause torque to be transferred from outer component 48 to ring rivet 52 via wall portions 55A of teeth 54, which wall portions radially overlap and are engaged against crests 58, with the ring rivet in turn transferring the torque to inner component 50 via wall portions 57A of teeth 56, which wall portions radially overlap and are engaged against troughs 60. Rotation of outer component 48 in the clockwise direction would result in wall portions 55B of teeth 56 transferring torque to ring rivet 52, and with the ring rivet in turn transferring the torque to inner component 50 via wall portions 57B of teeth 56. Thus, like assembly 10, the embodiment of FIGS. 11-13 similarly transfers torque via a ring rivet between two axially aligned components.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. An assembly for transferring torque comprising:
   a first component having an inner diameter including a plurality of first wall portions forming respective sides for a plurality of first notches;
   a second component having an outer diameter including a plurality of second wall portions forming respective sides for a plurality of second notches, wherein said plurality of first wall portions extends radially from said first component toward said second component, said plurality of second wall portions extends radially from said second component toward said first component, and the plurality of first wall portions is further, in a radial direction orthogonal to an axis of rotation for the assembly, from the axis of rotation for the assembly than the plurality of second wall portions; and,
   a ring rivet having a connecting portion inserted into the pluralities of first and second notches and deformed for creating at least one head on at least one axial side of said assembly for axially locking said first component and said second component together for creating a positive fit between said connecting portion and each of said first and second components for rotationally locking said first component and second component together for enabling a transfer of torque between said first component and said second component.

2. The assembly recited in claim 1, wherein said first component comprises a radially extending plate and said second component comprises a radially extending, annular projection wherein said annular projection is axially aligned with said radially extending plate and includes said plurality of second wall portions.

3. The assembly recited in claim 1, wherein said connecting portion of said ring rivet comprises a plurality of tabs extending axially from a ring body.

4. The assembly recited in claim 3, wherein:
   the pluralities of first and second notches include respective pairs of radially aligned first and second notches;
   said tabs each have a first shape;
   each respective pair of radially aligned first and second notches forms a second shape; and
   said first and second shapes are each selected from the group consisting of a rectangular shape, an arced shape, and a herringbone shape.

5. The assembly recited in claim 4, wherein said first shape is said arced shape and said second shape is said rectangular shape.

6. An assembly for transferring torque in a torque converter comprising:

a damper flange having an inner diameter including a plurality of first wall portions forming respective sides for a plurality of first notches;

a hub having an outer diameter including a plurality of second wall portions forming respective sides for a plurality of second notches, wherein said plurality of first wall portions extends radially from said damper flange toward said hub, said plurality of second wall portions extends radially from said hub toward said damper flange, and the plurality of first wall portions is further, in a radial direction orthogonal to an axis of rotation for the assembly, from the axis of rotation for the assembly than the plurality of second wall portions; and, a ring rivet having a connecting portion inserted into the pluralities of first and second notches and in contact with every first and second wall portion and deformed for creating at least one head on at least one axial side of said assembly for axially locking said damper flange and said hub together for creating a positive fit between said connecting portion and each of said damper flange and said hub for rotationally locking said damper flange and hub together for enabling a transfer of torque between said damper flange and said hub.

7. The assembly recited in claim 6, wherein said damper flange comprises a radially extending plate and said hub comprises a radially extending, annular projection wherein said annular projection is axially aligned with said radially extending plate and includes said plurality of second wall portions.

8. The assembly recited in claim 6, wherein said connecting portion of said ring rivet comprises a plurality of tabs extending axially from a ring body.

9. The assembly recited in claim 8, wherein:
the pluralities of first and second notches include respective pairs of radially aligned first and second notches;
said tabs each have a first shape;
each respective pair of radially aligned first and second notches forms a second shape; and
said first and second shapes are each selected from the group consisting of a rectangular shape, an arced shape, and a herringbone shape.

10. The assembly recited in claim 9, wherein said first shape is said arced shape and said second shape is said rectangular shape.

* * * * *